3,345,324
RUBBER COMPOSITIONS AND PROCESS FOR MAKING

Kenneth E. Bristol and Jack D. Strang, Akron, Ohio, assignors to The Goodyear Tire & Rubber Company, Akron, Ohio, a corporation of Ohio
No Drawing. Filed Jan. 3, 1964, Ser. No. 335,671
10 Claims. (Cl. 260—41.5)

This invention relates to a rubberlike composition. More particularly this invention is directed to the preparation of a material comprising a rubber and a finely divided filler with said material being a free-flowing powder.

Finely divided unvulcanized rubber filler powdery compositions have found use as an additive for asphalt and related bituminous materials and these powdery compositions have been made by combining a water suspension of the filler with a rubber latex and then co-precipitating by means of a coagulant. The precipitate is filtered and dried to give the finely divided unvulcanized rubber composition. By the prior art practices the finely divided free-flowing unvulvanized rubber compositions made by this method have been limited to relatively high percentages of filler relative to the rubber.

It is an object of this invention to provide a method whereby unvulcanized powdery rubber compositions may be obtained having a low filler to rubber ratio.

This invention may be practiced by (1) mixing an agglomerated latex having an average particle size of about 50 to about 300 microns and preferably about 70 to 150 microns in diameter with a finely divided filler material, preferably as a water slurry, (2) completing the precipitation of the rubber particles in contact with filler particles, (3) separating the resulting non-aqueous phase or precipitate from the aqueous phase, and (4) drying the separated precipitate to obtain a dry free-flowing unvulcanized rubber powder.

Since the latices obtained by the emulsion polymerization process normally have an average particle size appreciably less than 1 micron, it is necessary to pre-agglomerate the particles of the latex to obtain a latex having an average particle size of at least about 50 microns. This pre-agglomerating step is best viewed as comprising an electrolyte treatment to lower the effective emulsifying agent content to produce creaming whereby the average individual particles have a diameter no greater than about 1 to 5 microns with the individual particle exhibiting a tendency for several of the individual particles to cluster together reversibly in a group having a diameter of up to about 30 microns. The lowering of the effective emulsifying agent content is accomplished by adding an electrolyte such as sodium chloride to effect creaming of the latex. Then the creamed latex is treated with a coagulation agent to further agglomerate the particles to the range of 50 to 300 microns. The latex having an average particle size of about 50 to 300 microns according to the preferred practice is mixed with the finely divided filler material, preferably as a water slurry, and then more coagulant is added to insure irreversibility of the agglomerates in the presence of the finely divided filler particles to get distinct agglomerated particles or precipitate as distinguished from a mass agglomeration. This complete agglomeration is achieved normally by addition of further coagulation agent to lower the pH below 7.0 to about 6.0–5.5 and in some cases as low as about 4.5, although it should be appreciated that the same effect may be achieved by adding sodium silico fluoride prior to addition of the filler by warming the mixture to increase the degree of hydrolysis of the sodium silico fluoride. The precipitate may be separated by filtration and then be dried, to obtain free-flowing rubber powders containing from about 60 to 80% rubber with about 40 to 20% and as low as 15% of the inert filler materials. It should be appreciated that where the unvulcanized free-flowing powdery rubber composition is to be shipped an appreciable distance that the higher the rubber content the more desirable. Therefore, it is preferred that the rubber content be in excess of about 65% with even 70 to 80% being obtainable in general practice.

It has been found that any type of rubber latex is operable in the practice of this invention. Natural rubber latices, butadiene-styrene latices, i.e., GR-S latices, polybutadiene latices, butadiene-acrylonitrile latices and polyisoprene latices are representative examples of the olefinic polymers obtained by the polymerization of the conjugated diene having about 4 to 8 carbon atoms with about 0–80% of a monoolefin having from 2 to about 10 carbon atoms. It is preferred to use GR-S type latex containing about 20–28% by weight of rubber. The GR-S type latices contain copolymers of butadiene-styrene, with their respective amounts being about 70% and 30%. It is preferred that the rubber contain a small amount of a commercial antioxidant. Such a rubber can be processed at a higher temperature than is possible with rubber which does not contain an antioxidant.

Useful coagulants are sodium silicofluoride, aluminum sulfate, mixtures of aluminum sulfate and sodium chloride, highly buffered acid solutions such as a mixture of acetic acid and ammonium acetate salts and other electrolytes. The particle size of the rubber can be controlled by regulating the pH of the slurry, the concentration of the coagulant, degree of agitation, and the rate of addition thereof to the slurry. Finer particle size rubber filler can be obtained by maintaining vigorous agitation of the slurry during coagulation, by decreasing the concentration of the coagulating solution, by the choice of coagulant, by the use of additives such as sodium ligno sulphonate and sodium polyphosphates, and by decreasing the rate at which the coagulant is added to the slurry. The method of adding the coagulant and selection of the coagulant are important because the particle size can be partially controlled in this manner. For example, the composition should be agitated during the coagulation in order to make the composition more uniform and to disperse the coagulant. It has been found that aluminum sulfate and sodium silico-fluoride provide the best coagulants. The coagulants should be added in the concentration of about 2.0 to 8.0% by weight and in an amount sufficient to attain a concentration of about .10 to about 0.50% by weight, based on the total slurry including the coagulated material.

The following illustrative examples show other aspects of this invention. The parts and percentages are by weight unless they are otherwise specified.

Example I

A commercial latex containing about 24% of a butadiene-styrene (70/30%) copolymer and having an average particle size too small to be resolved under a microscope and no particles larger than about 5.0 microns was treated with about 0.5% of an antioxidant of the polytertiary alkyl phenol type. A salt solution comprising 94.3 parts of water, 25 parts NaCl and 1 part NaOH was added dropwise to 442 parts of the vigorously stirred latex. Addition of about 30 to 40 parts of the above salt solution gave the latex a pH of between 8–9 and the average particle size of the latex increased to about 1.0 micron with some particles becoming larger than 5 to 10 microns as the latex began to cream.

When the cream began to form rapidly in the latex, a slurry containing 25 parts $H_2O$ and 25 parts of a water dispersible carbon black was added to the latex and this addition was followed by the addition of 50 parts of water. Then the mixture was heated at about 100° F. before an additional 100 parts of water was added together with the rest of the above salt solution, i.e. about 80–90 parts. When the temperature of the resultant mixture reached about 130° F. a dilute solution of sulfuric acid (230 parts water and 2.1 parts of sulfuric acid) was added to reduce the pH to about 7.0. At this point 5 parts of additional carbon black dispersed in 15 parts water was stirred into the mixture and then the mixture was allowed to stand at about 70° F. for about 16 hours. The precipitate formed on standing was removed on a vacuum filter and back washed twice with 400 parts of water. The filter cake was repulped in 500 parts of water and again filtered. The filter cake was dried in a forced draft hot air oven and the dry product was passed through a 20-mesh U.S. standard screen to obtain a non-adhering free-flowing unvulcanized rubber filler composition.

*Example II*

To 1000 parts of a latex containing 29.9% polybutadiene and about 1% of phenyl-beta naphthylamine as an antioxidant was added a salt solution containing 60 parts NaCl, 240 parts water and 2.0 parts sodium hydroxide with the mixture being stirred vigorously until the latex had pre-agglomerated. Then a mixture consisting of 40 parts water and 20 parts sodium silicofluoride was added slowly to the vigorously stirred pre-agglomerated latex. A 33% water slurry of a mineral black was added and intimately mixed with the pre-agglomerated latex after the addition of the sodium silicofluoride solution.

The stirred dispersion of latex and mineral black was warmed to about 85° F. to effect precipitation of the polybutadiene-mineral black dispersion. The precipitate was removed by filtration, washed and dried. Essentially all the dry product passed through a 35 mesh screen. The dry product was essentially a free-flowing non-adhering powder containing 65.8% polybutadiene.

*Example III*

Another 629 parts of the latex containing about 20% of an 80/20 butadiene-styrene copolymer and about 1% of the antioxidant, phenyl-beta-naphthylamine was pre-agglomerated by treatment with a mixture of 30 parts sodium chloride, 150 parts water, 3 parts $Na_2P_2O_7 \cdot 10H_2O$ and 70 parts of a 5% solution of aluminum sulfate. High speed stirring of the latex in the agglomerating mixture was continued until the flocculation showed a decrease by observing a drop of the mixture on a filter paper (Whatman #1, 11 centimeters). At this point 10 parts of a 5% by weight aluminum sulfate solution was added and the high speed agitation of the resulting mixture was continued until essentially all the floc disappeared. The average particle size of the agglomerated latex was about 70 to 150 microns. A water slurry of coal dust (187.5 parts) was added to the aluminum sulfate agglomerated latex. The water slurry of coal dust was prepared by ball milling a mixture of 200 parts of coal dust and 1000 parts water for 84 hours. Dilute sulfuric acid (30:1) solution was added to the mixture of coal dust and agglomerated latex to insure the complete coagulation of the rubber particles. The precipitate was filtered, repulped in water, refiltered and dried to obtain a free-flowing unvulcanized rubber powder.

Instead of the carbon black or the coal dust used in the foregoing examples other finely divided inert fillers may be used to obtain the results of this invention. The finely divided inert fillers should be able to pass a 325 mesh U.S. standard screen and preferably should have an average particle size less than 10 to 20 microns. The finer the particle size of the filler the more effective it is. Representative examples of the mineral fillers are barytes, whiting, clays, diatomaceous earths and modified diatomaceous earths, powdered mineral rubber, asphaltenes and other bitumens having a softening point above 200° F. may be used, too.

While certain representative embodiments and details have been shown for the purpose of illustrating the invention, it will be apparent to those skilled in this art that various changes and modifications may be made therein without departing from the spirit or scope of the invention.

What is claimed is:
1. A method of preparing free-flowing unvulcanized rubber filler compositions comprising the steps of
   (1) mixing an agglomerated latex having an average rubber particle size of about 50 to 300 microns with an inert filler having an average particle size of less than 20 microns;
   (2) completing the coagulation of the rubber particles in contact with the inert filler particles;
   (3) separating the precipitate from the aqueous phase; and
   (4) drying the precipitate.
2. A method of preparing free-flowing unvulcanized rubber filler compositions comprising the steps of
   (1) treating a latex to obtain a water-rubber dispersion with the average diameter of the rubber particle being about 50 to 300 microns;
   (2) mixing the agglomerated latex having an average rubber particle size of about 50 to 300 microns with a water slurry of an inert filler having an average particle size of less than about 20 microns;
   (3) separating the solids from the aqueous phase; and
   (4) drying the precipitate.
3. The method of claim 1 wherein the rubber particle is a copolymer of butadiene and styrene.
4. The method of claim 1 wherein the inert filler is a bitumen having a softening point of at least about 200° F.
5. The method of claim 1 wherein the inert filler is a diatomaceous earth.
6. The method of claim 1 wherein the rubber particle is a copolymer of butadiene and styrene and the inert filler is a diatomaceous earth.
7. The method of claim 2 wherein the rubber particle is a copolymer of butadiene and styrene.
8. The method of claim 2 wherein the inert filler is a bitumen having a softening point of at least about 200° F.
9. The method of claim 2 wherein the inert filler is a diatomaceous earth.
10. The method of claim 2 wherein the rubber particle is a copolymer of butadiene and styrene and the inert filler is a diatomaceous earth.

References Cited

UNITED STATES PATENTS

| 3,194,781 | 7/1966 | Hedberg et al. | 260—41.5 |
| 3,258,448 | 6/1966 | Hallenbeck et al. | 264—41.5 |

MORRIS LIEBMAN, *Primary Examiner.*

J. S. WALDRON, S. L. FOX, *Assistant Examiners.*